(12) United States Patent
Castelli (10) Patent No.: US 10,301,030 B2
(45) Date of Patent: May 28, 2019

(54) MOVABLE PYLON

(71) Applicant: EMBRAER S.A., São José dos Campos/SP (BR)

(72) Inventor: Alberto Dei Castelli, São José dos Campos—SP (BR)

(73) Assignee: EMBRAER S.A., São José dos Campos—SP (BR)

( * ) Notice: Subject to any disclaimer, the term of this patent is extended or adjusted under 35 U.S.C. 154(b) by 394 days.

(21) Appl. No.: 14/513,737

(22) Filed: Oct. 14, 2014

(65) Prior Publication Data

US 2016/0368611 A1 Dec. 22, 2016

(30) Foreign Application Priority Data

Oct. 14, 2013 (BR) .............................. 102013026411

(51) Int. Cl.
*B64D 27/26* (2006.01)
*B64C 15/12* (2006.01)

(52) U.S. Cl.
CPC .............. *B64D 27/26* (2013.01); *B64C 15/12* (2013.01); *B64D 2027/262* (2013.01)

(58) Field of Classification Search
CPC .. B64D 27/26; B64D 2027/262; B64C 15/12; B64C 29/033; B64C 29/0075; B64C 27/18; B64F 5/0036; B64F 5/0081; F02C 7/20; F02K 1/002
See application file for complete search history.

(56) References Cited

U.S. PATENT DOCUMENTS

| | | | | |
|---|---|---|---|---|
| 2,677,931 A | * | 5/1954 | Prieto | B64C 15/12 244/52 |
| 5,960,626 A | * | 10/1999 | Baudu | F02K 1/76 244/110 B |
| 8,191,823 B2 | * | 6/2012 | Guering | B64C 15/12 244/54 |
| 2009/0072079 A1 | * | 3/2009 | Hawley | B64C 15/12 244/54 |
| 2010/0001121 A1 | * | 1/2010 | Verde Preckler | B64C 15/12 244/12.5 |
| 2010/0019081 A1 | * | 1/2010 | Cazals | B64C 15/12 244/56 |

* cited by examiner

*Primary Examiner* — Medhat Badawi
*Assistant Examiner* — Vicente Rodriguez
(74) *Attorney, Agent, or Firm* — Nixon & Vanderhye P.C.

(57) ABSTRACT

It is described a movable pylon, associated with a lower portion of aircraft wing and with an aircraft engine to change the height of this engine between a flying position and a ground position, the movable pylon comprising: a main unique structure formed by a first movable structure pivoted to a second fixed structure, the first movable structure associated with the engine, the second fixed structure associated with the wing, and a pivot mechanism connecting the first movable structure to at least one point on the wing.

5 Claims, 9 Drawing Sheets

MOVABLE PYLON

This application claims priority to BR Application No. 102013026411-3 filed on Oct. 14, 2013, the entire content of which is incorporated herein by reference.

The present invention refers to a movable pylon associated with the lower portion of an aircraft wing and to the engine of this aircraft, wherein this pylon is particularly used to change the height of this engine between a flying position and a ground position.

DESCRIPTION OF THE STATE OF THE ART

Figure 1:
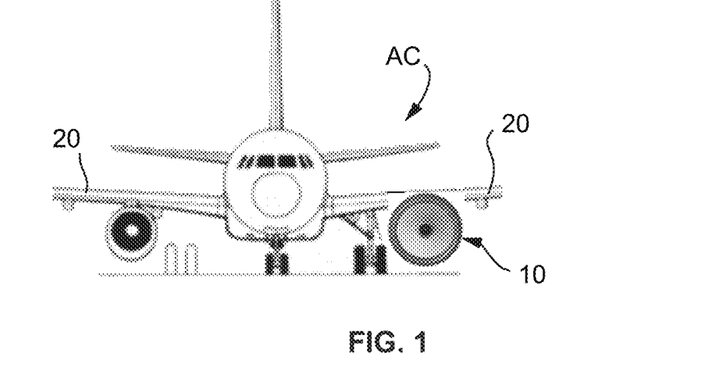
FIG. 1—it is a schematic view of the technical problem according to state of the art wing and engine configurations.
Figure 2:
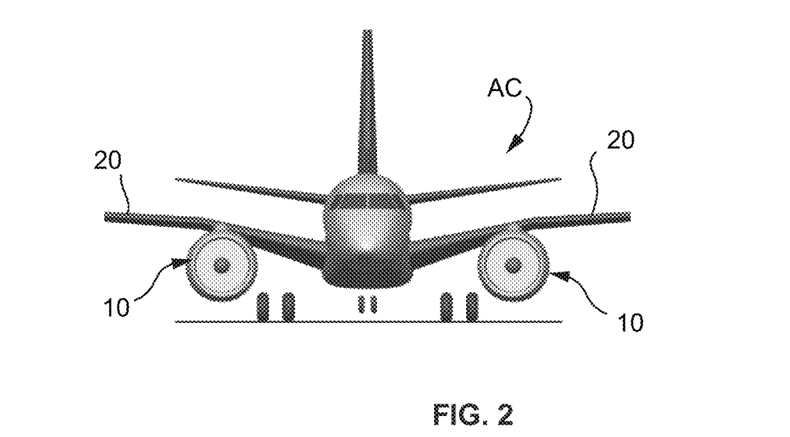
FIG. 2—it is a schematic view of a known state of the art solution for the problem shown in FIG. 1.

Currently, for the installation of new-generation engines having a wider diameter as, for instance, geared turbofan (GTF) engines in an aircraft it is necessary to make significant changes such as, for instance, a new wing and new landing gears so that the aircraft can adapt to the sizes of this new engine, as shown in FIGS. 1 and 2.

These changes generate high investment costs and require long periods of time before the aircraft is able to start operating, which may lead to the need of requesting a new certification (TC) for this aircraft.

Studies have been conducted to find new ways of adapting a new engine to the wings of an operating aircraft.

Document EP 2030892 refers to a suspension pylon of the engine under a wing. This pylon comprises a pantograph-like mechanism that enables the change of engine height on ground and in flight. More specifically, the pylon consists of two parts that are associated by this pantograph mechanism, formed by a deformable quadrilateral containing two rods parallel to each other and a hydraulic actuator. The fore side of the pylon supports the engine whereas the aft side is associated with the wing. Considering that the fore part of the pylon is only connected to the aft side of the pylon by means of the deformable quadrilateral, these structures: the aft side of the pylon and the deformable quadrilateral have to be strong enough to bear the engine weight, the drag forces and the torque applied on the motor. The pantograph mechanism presented by document EP 2030892 is a complex and not very rigid mechanism.

OBJECT OF THE INVENTION

The scope of the present invention is to provide a movable pylon capable of changing the height of the aircraft engine between a flying position and a ground position and vice-versa.

A further objective of this invention is to provide a movable pylon, strong enough and capable of sustaining and changing the height of the aircraft engine without resulting in a significant increase on aircraft weight.

BRIEF DESCRIPTION OF THE INVENTION

The object of the invention is a movable pylon, associated with a lower portion of aircraft wing and with an aircraft engine having the purpose of changing the height of this engine from a flying position to a ground position and vice-versa, wherein the pylon comprises: a main unique structure formed by a first movable structure pivoted to a second fixed structure, the first movable structure associated with the engine, the second fixed structure associated with the wing, and a pivot mechanism linking the first movable structure to at least one pivot point on the wing.

A further object of this invention is a movable pylon, associated with a lower portion of aircraft wing and with an aircraft engine to change the height of this engine between a flying position and a ground position and vice-versa, the movable pylon comprising: a main unique structure, associated to a lower portion of the wings by means of at least a pivot point and at least a pivot mechanism.

BRIEF DESCRIPTION OF DRAWINGS

The present invention will be described in details below, based on an example of embodiment represented in the drawings. The figures show.

DETAILED DESCRIPTION OF THE INVENTION

Figure 3A:
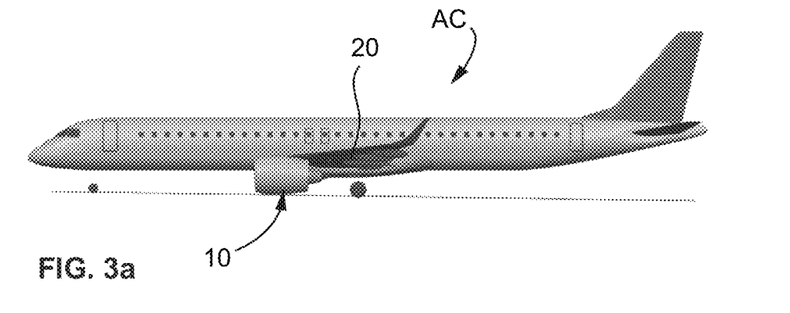
FIGS. 3*a* and 3*b*—show schematically an aircraft with movable pylon subject matter of this invention.
Figure 3B:
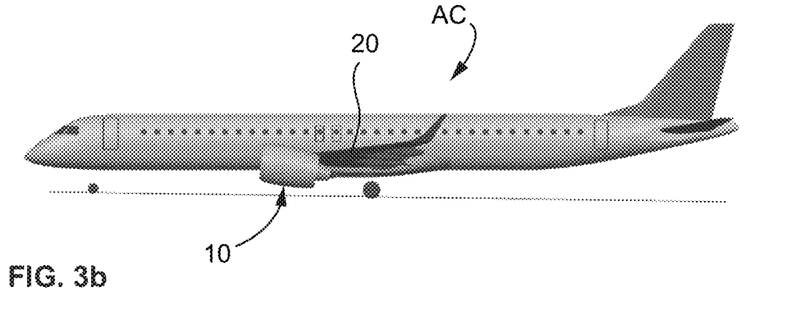

The embodiments of the present invention relate to a movable pylon assembly PA that is associated with a lower portion of a wing 20 of an aircraft AC and with a turbofan engine 10 (e.g., a GTF engine) of the aircraft AC. The movable pylon assembly PA has the purpose of changing the height of the turbofan engine 10 between a lowered flying position (see, e.g., FIG. 3*a*) and a raised ground position (see, e.g., FIG. 3*b*).

Figure 4A:
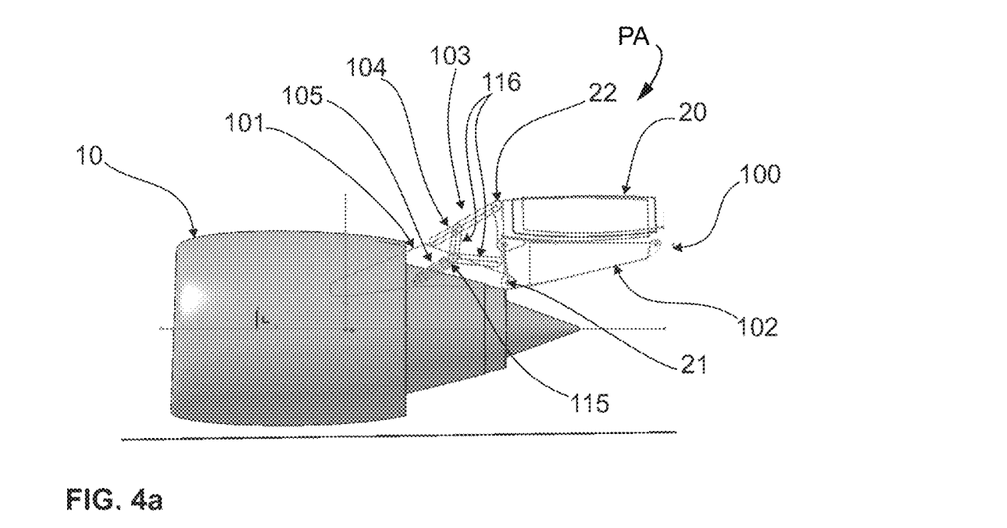
FIGS. 4*a* and 4*b*—show a first preferred configuration of the movable pylon subject matter of this invention.
Figure 4B:
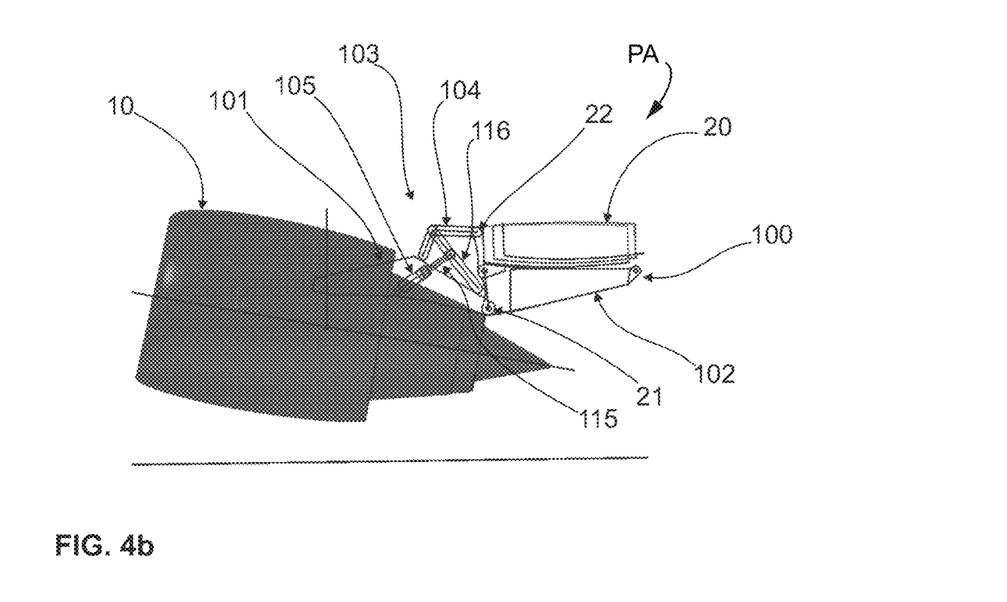

According to a first preferred embodiment shown in FIGS. 4*a* and 4*b*, the movable pylon assembly PA comprises a pylon mounting assembly 90 comprised of a main pylon structure 100, formed by a first movable pylon structure 101 connected pivotally to a second fixed pylon structure 102. The first movable pylon structure 101 is structurally associated with the aircraft engine 10, whereas the second fixed pylon structure 102 is structurally associated with the aircraft wing 20.

The pylon mounting assembly 90 includes a pivot drive mechanism 103 pivotally mounts the first movable structure 1 to at least a fixed attachment 22 in the fore region of the aircraft wing 20. The movable structure 101 pivots (rotates) around a pivot point 21 which defines a pivot axis 21*a* and is a connection point between the movable pylon structure 101 and the fixed pylon structure 102. The pivot axis 21*a* is moreover positionally fixed relative to the aircraft wing thereby enabling the change in height of engine 10, as mentioned above.

Figure 5A:
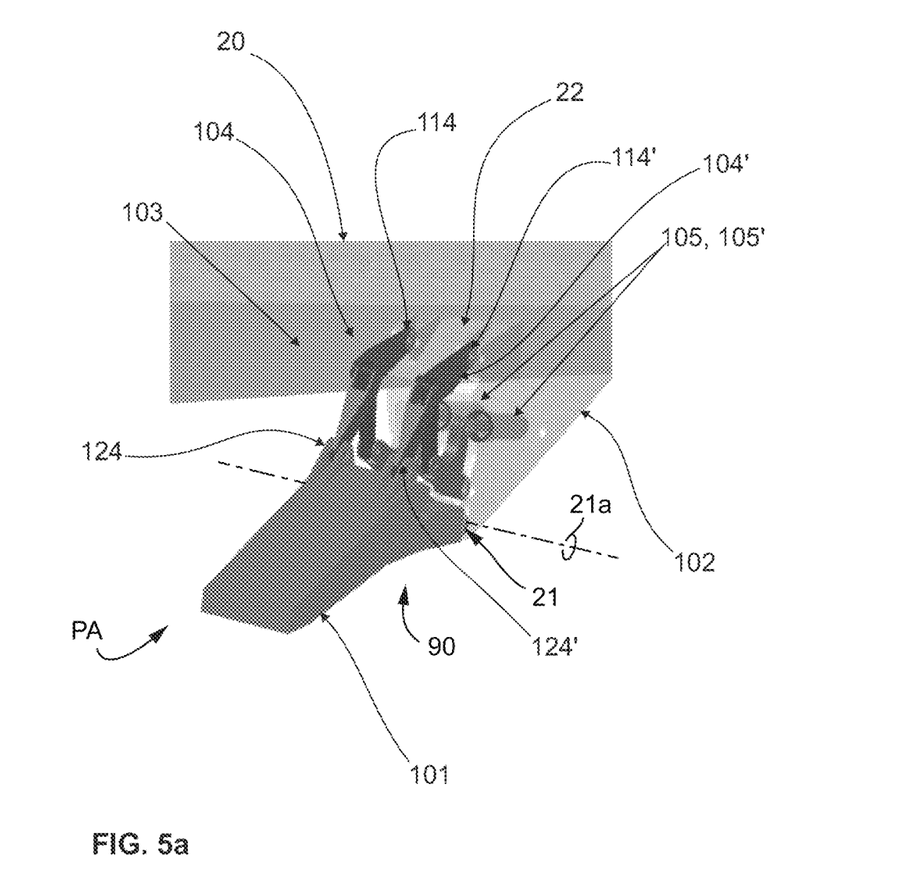
FIGS. 5*a*, 5*b* and 5*c*—show schematically a non-limiting example of the mechanism of the first preferred embodiment of the movable pylon.
Figure 5B:
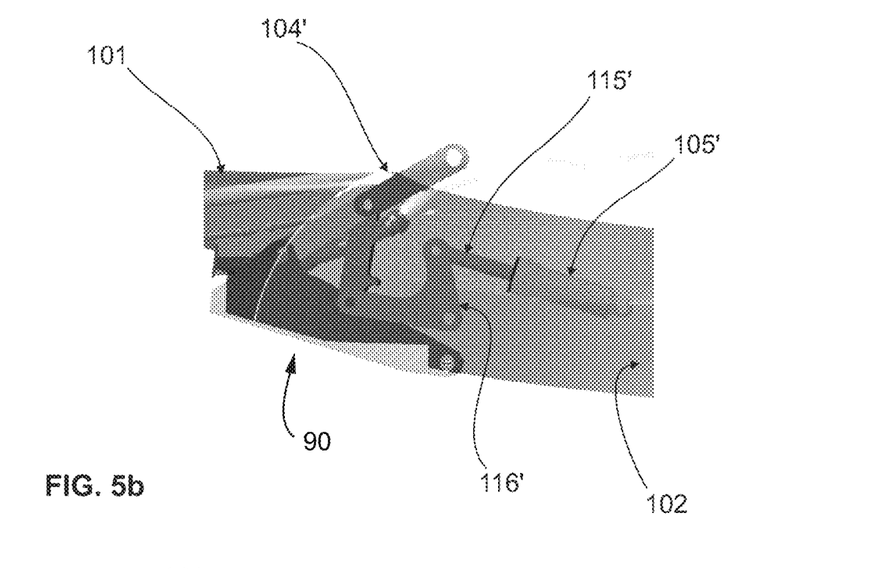
Figure 5C:
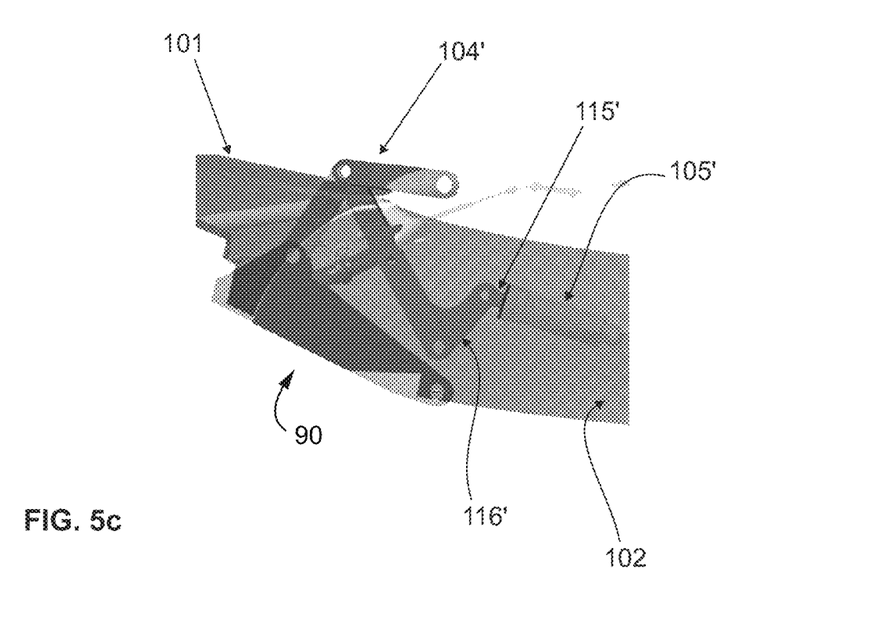

FIGS. 5*a*, 5*b* and 5*c* show schematically a non-limiting example of the pivot drive mechanism 103, which, according to this non-limiting example, is preferably comprised of a pair of parallel linkage bar assemblies comprised of first and second parallel linkage bars 104, 104'. The parallel linkage bars 104, 104' in turn comprise first extremities 114, 114' that are pivotally connected to the pivot point 22 on the wing 20 so as to be pivotal about the pivot axis 21a and second extremities 124, 124' which are pivotally connected to the first movable pylon structure 101. Furthermore, the pivot mechanism 103 comprises at least one and preferably two hydraulic or electric actuators 105, 105', one for each set of the parallel linkage bars 104, 104'.

The actuators 105, 105' are placed at the second fixed structure 102 and have actuating rods 115, 115' (see FIGS. 5b and 5c) operatively associated with control bars 116, 116' of the set of parallel linkage bars 104, 104'. Control bars 116, 116' connect directly rods 115, 115 to the parallel linkage bars 104, 104'.

When actuators 105, 105' move rods 115, 115' linearly so as to cause the rods 115, 115' to extend, the control bars 116, 116' are moved angularly to a final limit point, transmitting the movement of rods 115, 115' to the parallel linkage bars 104, 104' which in turn cause the first movable pylon structure 101 and the engine 10 attached thereto to pivot about the pivot axis 21a relative to the wing 20 thereby resulting in the engine 10 being displaced to lowered flying position (see FIG. 5b).

Similarly, when actuators 105, 105' move rods 115, 115 so as to cause the rods 115, 115' to retract, the control bars 116, 116' are responsively moved angularly back to the starting point thereby transmitting the movements of rods 115, 115' to parallel linkage bars 104, 104'. This movement of the parallel linkage bars 104, 104' will in turn case the first movable structure 101 and the engine 10 to pivotally move about the pivot axis 21a relative to the wing 20 thereby resulting in the engine 10 being displaced to the raised ground position (see FIG. 5c).

In a variant configuration of the embodiment illustrated in FIGS. 4a and 4b, the actuators 105, 105' are placed next to the first movable structure 101, and its actuation rods 115, 115' are operatively associated with control bars 116, 116' of the set of parallel linkage bars 104, 104'.

In this variant configuration, when actuators 105, 105' move rods 115, 115' linearly so as to expand them, the control bars 116, 116' are moved angularly to a final limit point, transmitting the movement of the rods 115, 115' to the linkage bars 104, 104' which in turn move the first movable structure 101 and the aircraft engine 10 thereby resulting in the engine 10 being upwardly pivoted about the pivot axis 21a into the raised ground position (see FIG. 4b). Conversely, when the actuators 105, 105' move rods 115, 115' linearly so as to retract them, the control bars 116, 116' are moved angularly back to the starting point, thereby transmitting the movement of the rods 115, 115' to linkage bars 104, 104' which then in turn pivotally move the first movable structure 101 and the aircraft engine 10 about the pivot axis 21a thereby resulting in the aircraft engine 10 being displaced into the raised flying position (see FIG. 4a).

Thus, this first preferred embodiment of this invention provides the flexibility of placing actuators 105, 105' either in the first movable structure 101 or in the second fixed structure 102, according to project needs.

Figure 6A:
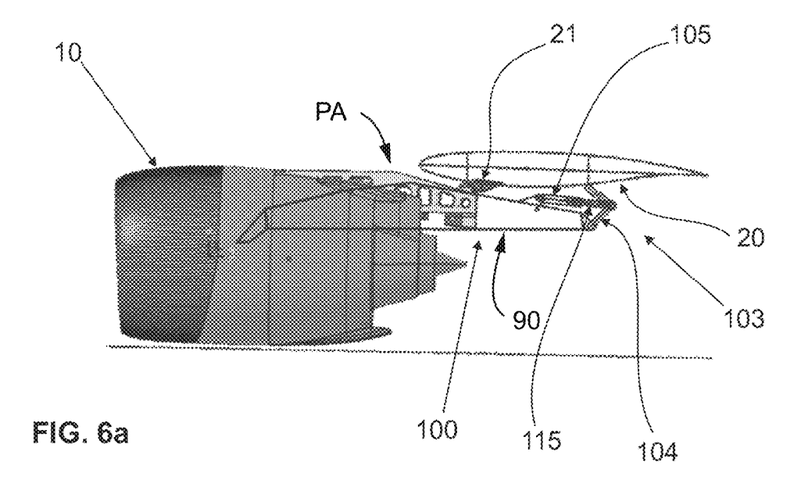
FIGS. 6*a* and 6*b*—show a second preferred embodiment of the movable pylon subject matter of this invention.
Figure 6B:
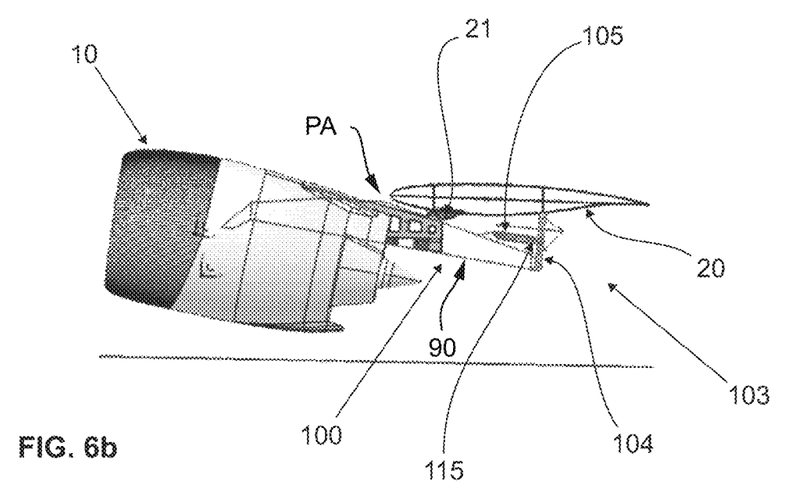

A second preferred embodiment of the present invention is illustrated in FIGS. 6a and 6b. As shown therein, such an embodiment includes a movable pylon assembly PA, associated with a lower portion of the aircraft wing 20 and and operatively mounting an aircraft engine 10 below the wing 20 so as to change the height of the aircraft engine 10 between a flying position and a ground position. Such a movable pylon assembly PA comprises a main pylon structure 100 and mounting structure associated with a lower portion of the wing 20 to mount the pylon structure and the engine 10 attached thereto to at least one pivot point 21 which is positionally fixed relative to the wing 20. A pivot mechanism 103 is operatively provided so as to allow pivotal movement of the engine 10 about the pivot axis defined at the pivot point 21 between a lowered flight position and a raised ground position.

In this second embodiment, the pivot point 21 and hence the fixed-position pivot axis defined thereby is placed in the lower portion of the wing 20 relatively close to engine 10, whereas pivot drive mechanism 103 comprises a set of first and second linkage bars 104 associated with the lower portion of the wing 20 in line with and positioned aft of the pivot point 21.

Like the first embodiment described previously, the pivot drive mechanism 103 still comprises a hydraulic or electric actuator 105 whose actuation rod 115 is operatively associated with a set of first and second linkage bars 104, so that when the hydraulic or electric actuator 105 moves rod 115 linearly so as to be extended, the linkage pivoted bars 104 are displaced so that the main pylon structure 100 of the movable pylon PA is pivotally displaced about the pivot axis of pivot point 21. Displacement of the main pylon structure 100 of the movable pylon PA will thereby in turn pivotally displace the engine 10 into the lowered flying position (see FIG. 6), i.e., by changing the height of the engine 10 relative to the raised ground position of the engine 10 (see FIG. 6b). The pivotal displacement of the main pylon structure 100 of the movable pylon assembly PA together with the engine 10 so as to positionally change the aircraft engine 10 and, consequently, its height as explained above, is done by the main pylon structure 100 be pivoted (rotated) about the pivot axis defined by the pivot point 21.

Figure 7A:
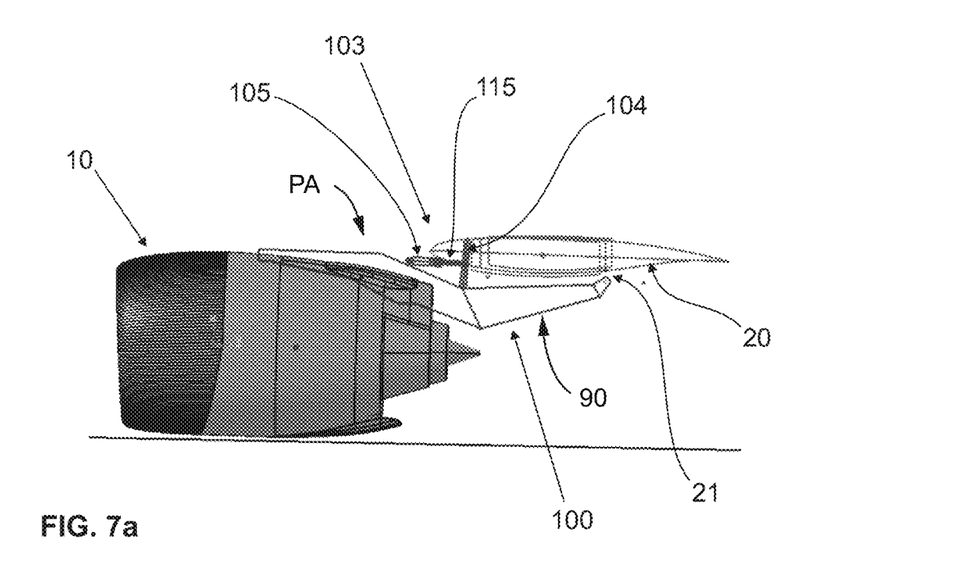
FIGS. 7*a* and 7*b*—show a third preferred embodiment of the movable pylon subject matter of this invention.
Figure 7B:
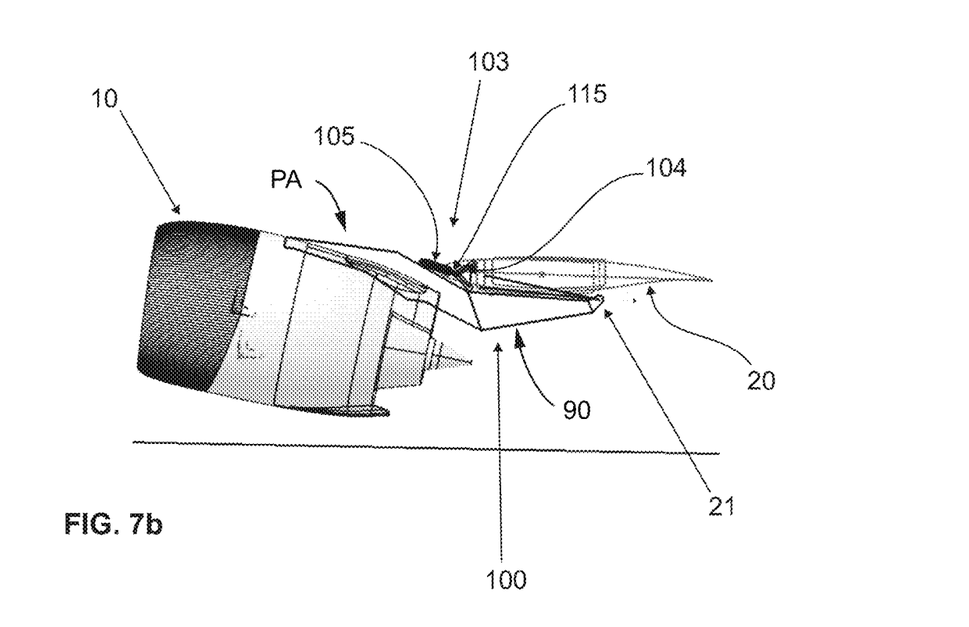

FIGS. 7a and 7b illustrate a third preferred embodiment of this invention. In this embodiment, the movable pylon assembly PA comprises the same characteristics described in the second embodiment, and the operation of the hydraulic or electric actuator 105, whose actuation rod 115 is associated with the set of pivoted bars 104, is the same of the second embodiment. However, in this third embodiment, the pivot drive mechanism 103, comprising a set of first and second linkage bars 104, is placed in the lower portion of the wing 20 relatively close to the engine 10, whereas the pivot axis defined by the pivot point 21 is also positioned relative to the lower portion of the wing 20, in line with and aft of the pivot drive mechanism 103.

The operation of pivot drive mechanism 103 in this third embodiment is the same as described above in relation to the second embodiment.

Figure 8A:
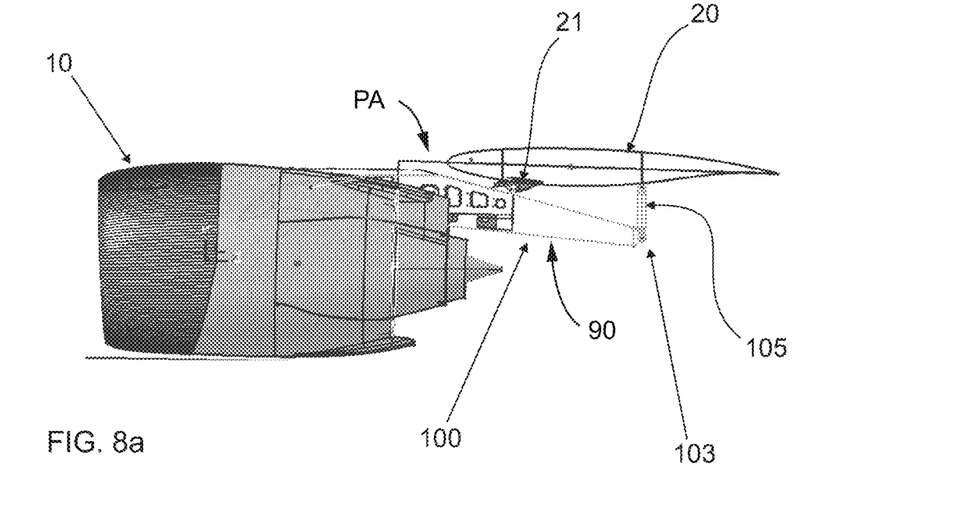
FIGS. 8*a* and 8*b*—show a forth preferred embodiment of the movable pylon subject matter of this invention.
Figure 8B:
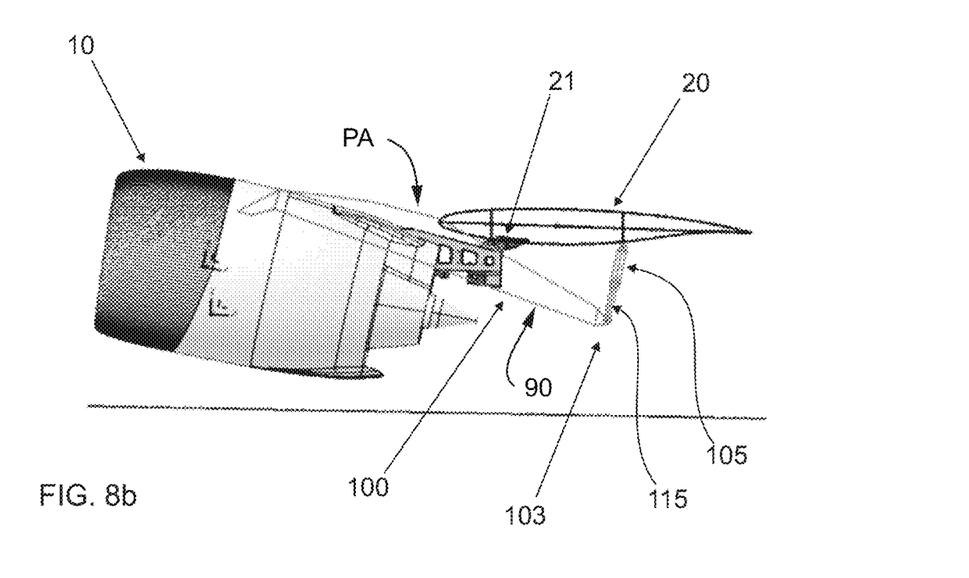

A fourth preferred embodiment is illustrated by FIGS. 8a and 8b, in which the movable pylon assembly PA is associated with a lower portion of aircraft wing 20 so as to movably mount the aircraft engine 10 to change the height of the engine 10 between a lowered flying position and a raised ground position. This movable pylon assembly comprises a main pylon structure 100 operatively connected to the lower portion of the wing 20 by means of at least one pivot point 21 and at least a pivot drive mechanism 103.

The pivot point 21 which defines a pivot axis positionally fixed relative to the aircraft wing is positioned in the lower portion of the wing 20 relatively close to the engine 10, whereas the pivot drive mechanism 103 is associated with the lower portion of the wing 20, in line with and aft of the pivot point 21.

In the fourth embodiment, the pivot drive mechanism 103 includes a hydraulic or electric actuator 105 only which is placed close to the lower portion of the wing 20 and having an actuation rod 115 which is operatively associated with an edge of the main pylon structure 100 of the movable pylon assembly opposite the aircraft engine 10.

When the hydraulic or electric actuator 105 extends the rod 115, I the rod 115 pushes the edge of the main pylon structure 100 of the movable pylon assembly opposite the engine 10 so that the main pylon structure 100 is caused to rotate about the pivot axis defined by the pivot point 21, thus moving the engine 10 to the raised ground position (see FIG. 8b).

Similarly, when the hydraulic or electric actuator 105 linearly retracts the rod 115, the rod 115 pulls the edge of the main pylon structure 100 of the movable pylon assembly PA opposite the engine 10 in the direction of the wing 20 so that the main pylon structure 100 undergoes rotation about the pivot axis defined by the pivot point 21 thereby pivotally moving the engine 10 into the raised flying position (see FIG. 8a).

Figure 9A:
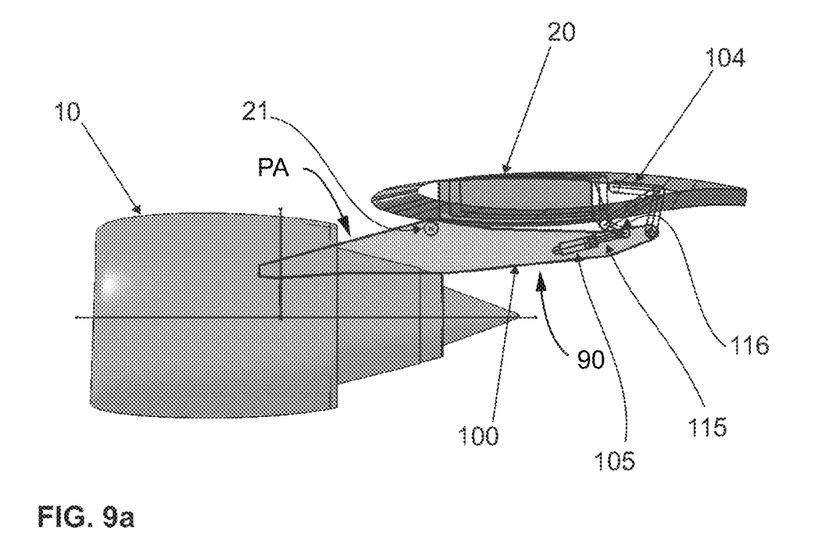
FIGS. 9*a* and 9*b*—show a fifth preferred embodiment of the movable pylon subject matter of this invention.
Figure 9B:
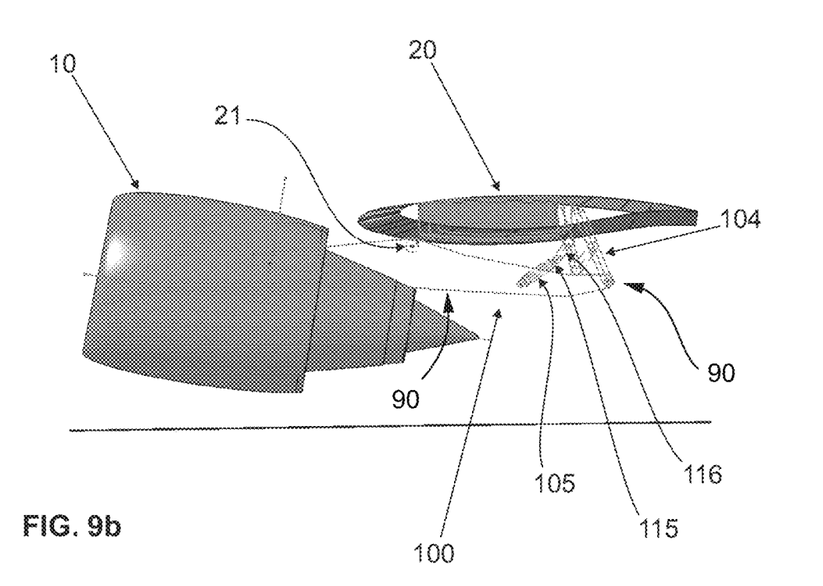

FIGS. 9a and 9b show the fifth preferred embodiment of the present invention. In this embodiment the movable pylon assembly PA comprises a main pylon structure 100 and structures operatively associated with the lower portion of the wing 20 to mount the aircraft engine to the wing 20 at least at one pivot point 21 which is positionally fixed relative to the wing 20 and at least a pivot drive mechanism 103.

The pivot point 21 includes a hinge, ball-and-socket-joint or another swivel direct to the lower portion of the wing 20, close to the engine 10.

The pivot drive mechanism 103 comprises a hydraulic or electric actuator 105 whose actuation rod 115 is associated operatively with a set of first and second linkage bars 104 by means of a control bar 116, so that when the hydraulic or electric actuator 105 linearly extends the actuation rod 115, the control bar 116 is moved angularly to a limit stroke, thereby transmitting the movement of the rod 115 to the linkage bars 104. The first and second linkage bars 104 are thus displaced so that the main pylon structure 100 of the movable pylon assembly PA is pivotally displaced together with engine 10 about the pivto axis defined by the pivot point 21 into the lowered flying position (see FIG. 9a). When the hydraulic or electric actuator 115 linearly retracts the actuation rod 115, the control bar 116 is moved angularly to the starting point, thereby transmitting the movement of the actuation rod 115 to the linkage bars 104 that are displaced so that the main pylon structure 100 of the movable pylon assembly PA is also pivotally displaced together with aircraft engine 10 into the raised ground position (see FIG. 9b).

Therefore, the movable pylon assembly PA in accordance with this invention permits the aircraft engine 10 be pivotally moved into a raised ground position, thereby increasing the angle of attack of the engine 10 which in turn increases the clearance distance of the aircraft engine 10 with respect to the ground. It is therefore possible to install larger new-generation turbofan engines with gains from 10 to 15% on fuel use without major modifications in existing aircraft structures and without the need for a new certification.

Moreover, if applied in new aircraft, the need for "seagull" wing shapes and/or an increase of length in TDP's-Landing Gears, is avoided.

When the aircraft engine 10 is in a raised ground position, the airscoop of the engine is higher, so there is less risk of intake of ground objects into the engine. Furthermore, in a take-off position, a support component of approximately 16% of tensile strength is gained, which allows the increase of maximum take-off weight (MTOW) thereby allowing the same wing design to be maintained despite an increase in weight attributable to the larger engines.

A further advantage lies in that the aircraft engine 10, when tilted, diminishes the jet effect during flap extension thereby allowing an increase of the angle of flap to be provided if needed.

It is worth highlighting that the movable pylon assemblies of the embodiments according to this invention allows aerodynamic optimization of engine cruising position, placing it in a lower position than the wing, as the mechanism clears the distance to ground during landing.

As it has been described a preferred example of embodiment, it should be understood that the scope of the present invention involves other possible variations, wherein it is solely limited by the content of the accompanying claims, including the possible equivalents therein.

The invention claimed is:

1. An aircraft comprising:
an aircraft wing;
a turbofan aircraft engine; and
a moveable aircraft engine pylon assembly having a lower portion attached to the aircraft engine for mounting the aircraft engine below the aircraft wing, and an upper portion which is pivotally mounted below the aircraft wing to allow pivotal movement of the engine pylon assembly and the aircraft engine attached to the lower portion of the engine pylon assembly about a pivot axis which is positionally fixed relative to the aircraft wing such that the aircraft engine attached to the lower portion of the engine pylon assembly is pivotally tiltable with the engine pylon assembly between a lowered flying position and a raised ground position to thereby provide increased ground clearance for the aircraft engine, wherein the engine pylon assembly includes:
 (i) a pivot mechanism for pivotally attaching a first portion of the engine pylon assembly to the aircraft wing at a pivot point defining the positionally fixed pivot axis to thereby allow pivotal displacement of the engine pylon assembly about the positionally fixed pivot axis between the lowered flying and raised ground positions, and
 (ii) a pivot drive mechanism operatively connecting a second portion of the engine pylon assembly to the aircraft wing, wherein the pivot drive mechanism is moveable between extended and retracted positions to responsively cause the second portion of the engine pylon assembly to pivot about the positionally fixed pivot axis to pivotally displace the aircraft engine into one of the lowered flying and raised ground positions, respectively, wherein the pivot drive mechanism comprises:
   a pair of parallel linkage bar assemblies each including first and second linkage bars having opposing proximal ends pivotally connected together at a pivot connection and having distal ends opposite to the proximal ends which are pivotally connected respectively to the aircraft wing and the second portion of the engine pylon assembly, and
   an actuator which includes an actuator rod that is moveable between extended and retracted positions, wherein the actuator rod is operatively connected to the pivot connection of the opposed proximal ends of the first and second linkage bars such that movement of the actuator rod between the retracted and extended positions causes the first and second linkage bars to articulate about the pivot connection between first and second angular relationships to responsively cause the engine pylon assembly and the aircraft engine mounted to the lower portion of the engine pylon assembly to pivot about the positionally fixed pivot axis such that the aircraft engine is pivotally displaced into one of the lowered flying and raised ground positions, respectively.

2. The aircraft according to claim 1, wherein the actuator is a hydraulic or electric actuator.

3. The aircraft according to claim 1, wherein the engine pylon assembly further comprises a fixed aft pylon member which is immovably mounted to the aircraft wing, and a forward pylon member which is pivotally attached to the fixed aft pylon member by the pivot mount of the engine pylon assembly.

4. The aircraft according to claim 3, wherein the pivot drive mechanism comprises:
   first and second sets of parallel linkage bar assemblies, wherein
   each of the first and second sets of parallel linkage bar assemblies includes first and second linkage bars having opposed proximal first ends pivotally connected together at first and second pivot connections and second distal ends opposite to the proximal first ends, wherein
   the second distal ends of the first and second linkage bars of the first set of parallel linkage bar assemblies are pivotally connected to the fixed aft pylon member and to the second set of parallel linkage bar assemblies at the second pivot connections, respectively, and wherein
   the second distal ends of the first and second linkage bars of the second set of parallel linkage bar assemblies are pivotally connected to the forward pylon member and the aircraft wing, respectively.

5. The aircraft according to claim 4, wherein the actuator is operatively connected to the first pivot connection of the first and second linkage bars of the first set of parallel linkage bar assemblies, such that angular displacement of first and second linkage bars of the first set of parallel linkage bar assemblies at the first pivot connection causes pivotal movement and angular displacement of the first and second linkage bars of the second set of parallel linkage bar assemblies about the second pivot connection to thereby pivotally move the aircraft engine between the lowered flying position and the raised ground position, respectively.

* * * * *